(12) United States Patent
Miyake et al.

(10) Patent No.: US 11,707,679 B2
(45) Date of Patent: Jul. 25, 2023

(54) MEDIUM, INFORMATION PROCESSING APPARATUS, AND METHOD FOR GENERATING A NATURAL SENTENCE

(71) Applicant: SQUARE ENIX CO., LTD., Tokyo (JP)

(72) Inventors: Youichiro Miyake, Tokyo (JP); Shinpei Sakata, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 17/214,732

(22) Filed: Mar. 26, 2021

(65) Prior Publication Data

US 2021/0299566 A1 Sep. 30, 2021

(30) Foreign Application Priority Data

Mar. 30, 2020 (JP) ................. 2020-059725

(51) Int. Cl.
| | | |
|---|---|---|
| *A63F 13/60* | (2014.01) | |
| *A63F 13/85* | (2014.01) | |
| *G06F 40/56* | (2020.01) | |
| *A63F 13/54* | (2014.01) | |
| *A63F 13/45* | (2014.01) | |

(52) U.S. Cl.
CPC ............. *A63F 13/60* (2014.09); *A63F 13/45* (2014.09); *A63F 13/54* (2014.09); *A63F 13/85* (2014.09); *G06F 40/56* (2020.01)

(58) Field of Classification Search
CPC .......... A63F 13/45; A63F 13/54; A63F 13/60; A63F 13/67; A63F 13/69; A63F 13/85; G06F 40/56
See application file for complete search history.

(56) References Cited

U.S. PATENT DOCUMENTS

| | | | | |
|---|---|---|---|---|
| 8,187,104 | B2* | 5/2012 | Pearce | A63F 13/69 |
| | | | | 463/43 |
| 8,425,325 | B2* | 4/2013 | Hope | G06F 16/4393 |
| | | | | 463/31 |
| 8,856,225 | B2* | 10/2014 | Pearce | H04L 51/02 |
| | | | | 709/239 |
| 10,095,692 | B2* | 10/2018 | Song | G06F 40/56 |
| 10,536,758 | B2* | 1/2020 | Packard | H04N 21/25883 |
| 2007/0087798 | A1* | 4/2007 | McGucken | A63F 13/58 |
| | | | | 463/1 |
| 2008/0221892 | A1* | 9/2008 | Nathan | G06F 40/35 |
| | | | | 704/9 |

(Continued)

FOREIGN PATENT DOCUMENTS

| | | |
|---|---|---|
| JP | 2001300131 A | 10/2001 |
| JP | 2010110566 A | 5/2010 |

(Continued)

OTHER PUBLICATIONS

Notification of Reasons for Rejection for Japanese Application No. 2020-059725, dated May 11, 2021, with English translation; pp. all.

(Continued)

*Primary Examiner* — William H McCulloch, Jr.
(74) *Attorney, Agent, or Firm* — Dorsey & Whitney LLP

(57) ABSTRACT

A computer is caused to execute: acquiring the log; generating a natural sentence based on the acquired log; and generating story content to be appreciated by a user by arranging the generated natural sentence and one or a plurality of game-related contents that are related to the log.

9 Claims, 11 Drawing Sheets

(56) References Cited

U.S. PATENT DOCUMENTS

| | | | | |
|---|---|---|---|---|
| 2009/0131177 | A1* | 5/2009 | Pearce | A63F 13/822 463/43 |
| 2009/0150760 | A1* | 6/2009 | Winkler | A63F 13/52 715/202 |
| 2009/0209335 | A1* | 8/2009 | Pearce | H04L 67/02 463/30 |
| 2010/0203970 | A1* | 8/2010 | Hope | G06F 16/4393 704/235 |
| 2011/0107217 | A1* | 5/2011 | Schwarz | G09B 5/062 715/730 |
| 2016/0105708 | A1* | 4/2016 | Packard | H04N 21/23439 725/10 |
| 2016/0220903 | A1* | 8/2016 | Miller | A63F 13/537 |
| 2019/0103106 | A1* | 4/2019 | Boeda | G06T 19/006 |
| 2020/0068272 | A1* | 2/2020 | Packard | H04N 21/8456 |
| 2020/0134074 | A1* | 4/2020 | Mankovskii | G06F 16/26 |
| 2021/0224486 | A1* | 7/2021 | Stabler | G06F 40/56 |
| 2021/0299566 | A1* | 9/2021 | Miyake | A63F 13/45 |

FOREIGN PATENT DOCUMENTS

| | | | |
|---|---|---|---|
| JP | 2010517186 | A | 5/2010 |
| JP | 2018510037 | A | 4/2018 |

OTHER PUBLICATIONS

"Bunsho Sakusei Group—Sato Kenkyushitsu (Sato Lab, Sentence Generation Group)", [retrieved Jan. 28, 2020], Sato Kenkyushitsu (Sato Lab) with English translation <URL:https://sites.google.com/site/sslabnagoya/research/sakka>.

Orikasse, "Shosetsu wo Jido Seisei Dekiru Jenereta 23-Sen-Tsuru Jido Seisei (Selection of 23 Generators Capable of Automatically Generating a Novel [Tool Automatic Generation])", Oct. 3, 2019, with English translation <URL:https://lifelikewriter.com/novel-generator/>.

Kameko, Hirotaka et al., "Automatic Generation of Shogi Commentary with a Log-Linear Language Model", Journal of Information Processing Society of Japan, vol. 55, No. 11, 2431-2440, Nov. 2014 with English abstract.

Senoo, Yudai , ""Monogatari Jido Seisei Program 'Jene-Jene Chan' no Tsukuri Kata Kiso-hen", The Making of Story Automatic Generation Program"GeneGene-Chan", The Basics", Dec. 20, 2017, Vrai Blog, [retrieved Jan. 28, 2020] with English translation <URL:http://blog.vrai.jp/article/455677889.html?seesaa_related=related_article>.

[English Translation] Decision of Final Rejection dated Feb. 1, 2022 for Japanese Patent Application No. 2020-059725.

* cited by examiner

MEDIUM, INFORMATION PROCESSING APPARATUS, AND METHOD FOR GENERATING A NATURAL SENTENCE

CROSS-REFERENCE TO RELATED APPLICATION(S)

This application claims priority to and the benefit of Japanese Patent Application No. 2020-59725, filed on Mar. 30, 2020, the disclosure of which is expressly incorporated herein by reference in its entirety for any purpose.

FIELD

At least one embodiment of the present disclosure relates to a program, an information processing apparatus, and a method for generating a natural sentence.

BACKGROUND

Conventionally, various techniques for automatically generating a natural sentence have been proposed. Examples of such techniques may be found in "*Bunsho Sakusei Group-Sato Kenkyushitsu* (Sato Lab, Sentence Generation Group)", [retrieved Jan. 28, 2020], *Sato Kenkyushitsu* (Sato Lab), Internet <URL: https://sites.google.com/site/sslabnagoya/research/sakka>, Yudai Senoo, "*Monogatari Jido Seisei Program 'Jene-Jene Chan' no Tsukuri Kata Kiso-hen* (The Making of Story Automatic Generation Program "GeneGene-Chan", The Basics", Dec. 20, 2017, Vrai Blog, [retrieved Jan. 28, 2020], Internet <URL: http://blog.vrai.jp/article/455677889.html?seesaa_related=related_article>, and orikasse, "*Shosetsu wo Jido Seisei Dekiru Jenereta 23-Sen-Tsuru Jido Seisei* (Selection of 23 Generators Capable of Automatically Generating a Novel [Tool Automatic Generation])", Oct. 3, 2019, *Raikatsu*, [retrieved Jan. 28, 2020], Internet <URL: https://lifelikewriter.com/novel-generator/>. In addition, a technique for automatically generating commentary from a game record of Shogi has been proposed. Examples of such technique may be found in Hirotaka Kameko, et al., "Automatic Generation of Shogi Commentary with a Log-Linear Language Model", Journal of Information Processing Society of Japan, Vol. 55, No. 11, 2431-2440, November 2014.

Furthermore, a system for collecting information of respective game machines, generating situation data made into sentences by a management server apparatus, allowing an unspecified number of people to browse game situations, and subsequently releasing replay data by superimposition is proposed. Examples of such system may be found in Japanese Patent Application Publication No. 2010-110566.

SUMMARY

Conventionally, while there are methods involving recording contents of game play as a moving image or creating a replay novel as methods employed by a player of a game to retain play contents, both of these methods are effort-intensive and not many players actually use such methods to record contents of game play. In addition, even though there are examples of computer games that provide a function for recording a screenshot at a timing such as when winning a trophy, the function simply enables a game screen to be recorded at a target timing and is not something that can be appreciated as a story.

An object of at least one embodiment of the present disclosure is to solve the problems described above and to retain contents of game play as a story that can be appreciated without requiring too much effort on the part of a player.

From a non-limiting perspective, an aspect of the present disclosure is a program that causes a computer to be connected to a log storage apparatus which stores a log of a game to function as: log acquiring means which acquires the log; natural sentence generating means which generates a natural sentence based on the acquired log; and story generating means which generates story content to be appreciated by a user by arranging the generated natural sentence and one or a plurality of game-related contents that are related to the log.

Moreover, the present disclosure can also be comprehended as an information processing apparatus, an information processing system, a method executed by a computer, or a program which a computer is caused to execute. In addition, the present disclosure can also be comprehended as a recording of such a program on a recording medium that is readable by an apparatus such as a computer, a machine, or the like. In this case, a recording medium that is readable by a computer or the like refers to a recording medium which stores information such as data and or a program by an electric action, a magnetic action, an optical action, a mechanical action, or a chemical action and which can be read by a computer or the like.

Each of the embodiments of the present application selves one or more deficiencies.

DESCRIPTION OF EMBODIMENTS

Hereinafter, examples of embodiments of the present disclosure will be described with reference to the drawings. It should be noted that the embodiments described below merely represent examples of implementing the present disclosure and are not intended to limit the present disclosure to the specific configurations described below. When implementing the present disclosure, a specific configuration may be adopted as deemed appropriate in accordance with each embodiment.

In addition, the various components in the examples of the respective embodiments described below can be combined as deemed appropriate as long as no inconsistencies and the like arise from such combinations. Furthermore, a description of contents described as an example of a given embodiment may be omitted in other embodiments. In addition, contents of operations and processing that are unrelated to characteristic portions of each embodiment may sometimes be omitted. Furthermore, various processing steps that constitute various flows to be described below are in a random order as long as no inconsistencies and the like arise in contents of processing.

First Embodiment

Configuration of Apparatus

Figure 1:
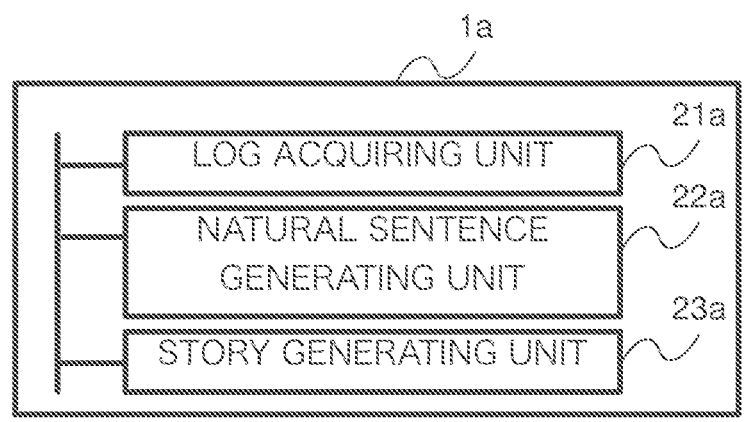
FIG. 1 is a diagram showing an outline of a functional configuration of an information processing apparatus that corresponds to at least one embodiment of the present disclosure.

FIG. 1 is a diagram showing an outline of a functional configuration of an information processing apparatus 1a according to the present embodiment. The information processing apparatus 1a according to the present embodiment also functions as an information processing apparatus including a log acquiring unit 21a, a natural sentence generating unit 22a, and a story generating unit 23a as a processor interprets and executes various programs having been loaded on various memories. While an example in which all of these functions are to be executed by a general-purpose processor will be described in the present embodiment, alternatively, a part of or all of the functions may be realized by one or a plurality of processors. In addition, each functional unit included in the information processing apparatus 1a may be implemented remotely and/or implemented in a distributed manner (for example, on the cloud). Furthermore, the functional units may be realized by a plurality of software modules instead of a single software module.

The log acquiring unit 21a acquires a log of a game (not limited to computer games) being played by a user (a player) from a log storage apparatus (not illustrated) that stores the log. In this case, for example, play data or saved data of a computer game, a game record of Shogi or chess, a play record of a board game or a card game, or the like corresponds to a log of a game and types of games to be an object of a log are not limited. A log of a game includes information in which information that enables contents of actions or contents of operations of a player during a game, events that have occurred in the game, states of the game, and the like to be specified is recorded together with information that enables a timing (hereinafter, referred to as an "in-game timing" which may be expressed by, for example, an in-game time, an actual time, or an in-game turn number) at which the log had been generated/recorded in the game to be specified. In other words, a log of a game is a record which enables a certain amount or more of game play to be reproduced. It should be noted that the log storage apparatus may be mounted inside the information processing apparatus 1a or mounted to another apparatus that is connected via communicating means such as a network.

The natural sentence generating unit 22a generates a natural sentence (a sentence composed of natural language) based on the log having been acquired by the log acquiring unit 21a. When generating a natural sentence, the log is referred to in an order of in-game timings, and a natural sentence along an order of game play is generated by having a natural sentence based on the log be generated along a time series in the game. While specific means for generating a natural sentence is not limited, for example, a template text of a natural sentence or a machine learning model that enables a natural sentence to be generated from a log can be used.

The story generating unit 23a generates story content to be appreciated by the user by arranging the natural sentence having been generated by the natural sentence generating unit 22a and one or a plurality of game-related contents related to the log having been acquired by the log acquiring unit 21a. In this case, game-related content refers to content such as an image, music, or the like that is used in relation to a game and types of contents are not limited. For example, a game image may either be a still image or a moving image. As game-related content, for example, the story generating unit 23a can acquire an image having been automatically recorded as the game progresses, an image recorded in response to an instruction issued by the user during the game, an image reproduced using a game program by referring to the log, an image prepared in advance, or music data to be reproduced during the game. When the game is not a computer game (such as Shogi, chess, or a board game), for example, an image obtained by imaging a situation of game play may be used. In addition, in doing so, content may be acquired by acquiring data of the content itself or by acquiring a link or the like to the data of the content.

Flow of Processing

Next, a flow of processing to be executed in the present embodiment will be described. It is to be understood that specific contents and processing sequences of the processing shown in the flow chart according to the embodiment merely represent one example of implementing the present disclosure. Specific contents and processing sequences of the processing may be selected as deemed appropriate in accordance with the embodiments of the present disclosure.

Figure 2:
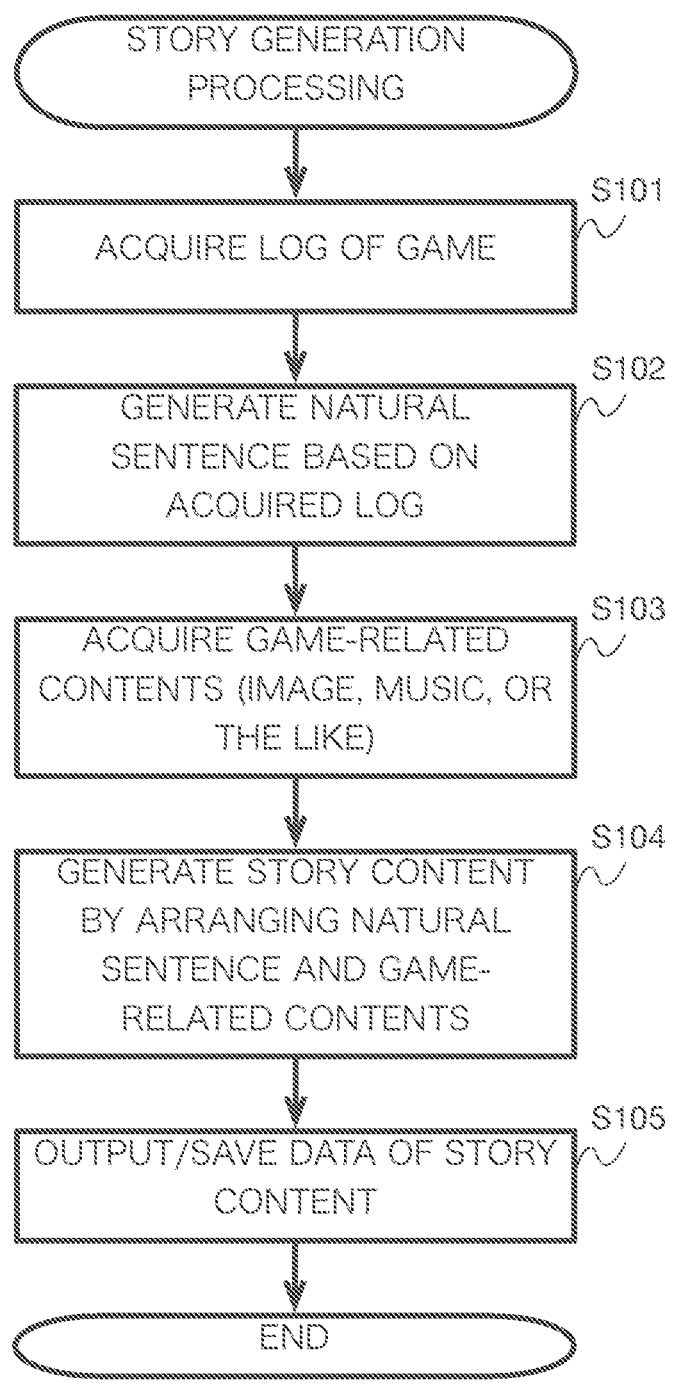
FIG. 2 is a flow chart showing a flow of story generation processing that corresponds to at least one embodiment of the present disclosure.

FIG. 2 is a flow chart showing a flow of story generation processing according to the first embodiment. Execution of the processing shown in the present flow chart is triggered by reception by the information processing apparatus 1a of an instruction to start story generation.

In step S101 and step S102, a natural sentence based on a log is generated. The log acquiring unit 21a acquires a log from the log storage apparatus (step S101). As described earlier, the log acquired at this time includes information that enables an in-game timing to be specified. Once a log is acquired by the log acquiring unit 21a, the natural sentence generating unit 22a refers to the acquired log in an order of in-game timings and generates a natural sentence along a time series in a game (step S102). Subsequently, the processing advances to step S103.

In step S103, game-related contents are acquired. The story generating unit 23a acquires one or a plurality of game-related contents (step S103). The game-related contents that are acquired at this time are game-related contents that are related to logs stored in the log storage apparatus. Subsequently, the processing advances to step S104.

In step S104 and step S105, story content is generated and output. The story generating unit 23a generates story content to be appreciated by the user by arranging the natural sentence having been generated by the natural sentence generating unit 22a and one or a plurality of game-related contents related to the log having been acquired by the log acquiring unit 21a (step S104). Data (hereinafter, referred to as "story data") of the generated story content is output to and saved by a storage apparatus of the information processing apparatus 1a or another storage apparatus (step S105). Subsequently, the processing shown in the present flow chart is ended.

As described above, as an aspect of the present disclosure, the information processing apparatus 1a includes the log acquiring unit 21a, the natural sentence generating unit 22a, and the story generating unit 23a. Therefore, according to the aspect of the present disclosure, story content to be appreciated by the user (for example, story content with illustrations or story content with background music) can be generated.

Second Embodiment

Next, a second embodiment will be described. With respect to components and processing contents in common with the first embodiment, the first embodiment will be referred to and descriptions thereof will be omitted.

Configuration of Apparatus

Figure 3:
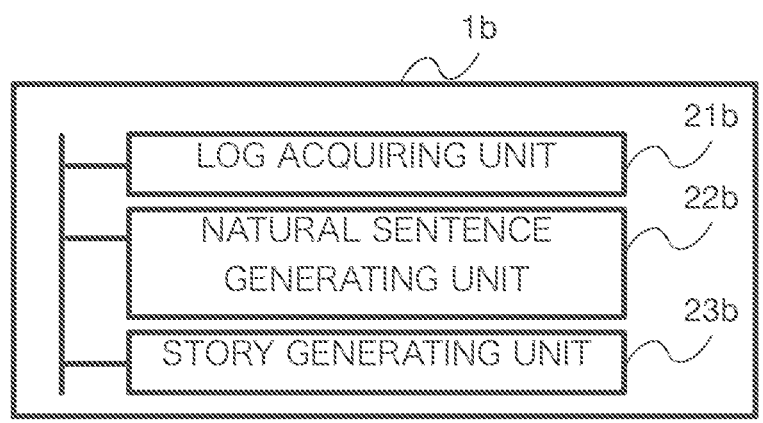
FIG. 3 is a diagram showing an outline of a functional configuration of an information processing apparatus that corresponds to at least one embodiment of the present disclosure.

FIG. 3 is a diagram showing an outline of a functional configuration of an information processing apparatus 1b according to the present embodiment. While the information processing apparatus 1b according to the present embodiment includes a log acquiring unit 21b, a natural sentence generating unit 22b, and a story generating unit 23b in a similar manner to the first embodiment, contents of processing by the story generating unit 23b differ from contents of processing described in the first embodiment.

In the second embodiment, the story generating unit 23b arranges each of one or a plurality of game-related contents in proximity to a natural sentence that corresponds to a log related to an in-game timing in proximity to an in-game timing related to the game-related content.

Flow of Processing

Next, a flow of processing to be executed in the present embodiment will be described. It is to be understood that specific contents and processing sequences of the processing shown in the flow chart according to the embodiment merely represent one example of implementing the present disclosure. Specific contents and processing sequences of the processing may be selected as deemed appropriate in accordance with the embodiments of the present disclosure.

Figure 4:
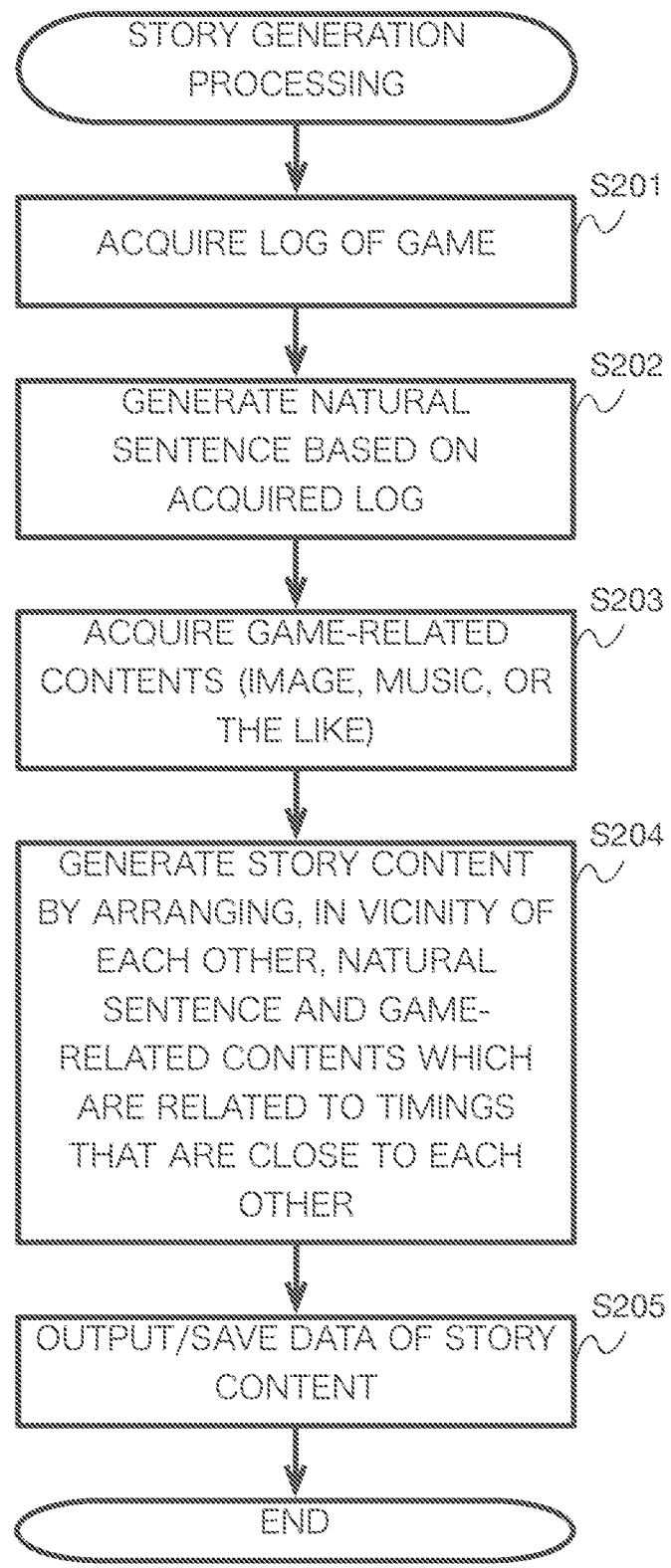
FIG. 4 is a flow chart showing a flow of story generation processing that corresponds to at least one embodiment of the present disclosure.

FIG. 4 is a flow chart showing a flow of story generation processing according to the second embodiment. Execution of the processing shown in the present flow chart is triggered by reception by the information processing apparatus 1b of an instruction to start story generation.

In step S201 and step S202, a natural sentence based on a log is generated. The log acquiring unit 21b acquires a log from the log storage apparatus (step S201). In a similar manner to the first embodiment, the log acquired at this time includes information that enables a timing (an in-game timing) at which the log had been generated in the game to be specified. Once a log is acquired by the log acquiring unit 21b, the natural sentence generating unit 22b generates a natural sentence based on the acquired log (step S202). Subsequently, the processing advances to step S203.

In step S203, game-related contents are acquired. The story generating unit 23b acquires one or a plurality of game-related contents (step S203). The game-related contents that are acquired at this time are game-related contents that are related to logs stored in the log storage apparatus. In addition, the game-related contents that are acquired at this time are associated with an in-game timing related to the game-related contents as metadata. Subsequently, the processing advances to step S204.

In step S204 and step S205, story content is generated and output. The story generating unit 23b generates story content to be appreciated by the user by arranging the natural sentence having been generated by the natural sentence generating unit 22b and one or a plurality of game-related contents related to the log having been acquired by the log acquiring unit 21b (step S204). In this case, the story generating unit 23b arranges each of one or a plurality of game-related contents in proximity to a natural sentence that corresponds to a log related to an in-game timing in proximity to an in-game timing related to the game-related content. Generated story data is output to and saved by a storage apparatus of the information processing apparatus 1b or another storage apparatus (step S205). Subsequently, the processing shown in the present flow chart is ended.

As described above, as an aspect of the present disclosure, the information processing apparatus 1b includes the log acquiring unit 21b, the natural sentence generating unit 22b, and the story generating unit 23b, and the story generating unit 23b arranges game-related content in proximity to a natural sentence that corresponds to a log of which an in-game timing is close. Therefore, according to the aspect of the present disclosure, content of a natural sentence in a story content and a game-related content can be associated with each other.

Third Embodiment

Next, a third embodiment will be described. With respect to components and processing contents in common with the first embodiment, the first embodiment will be referred to and descriptions thereof will be omitted.

Configuration of Apparatus

Figure 5:
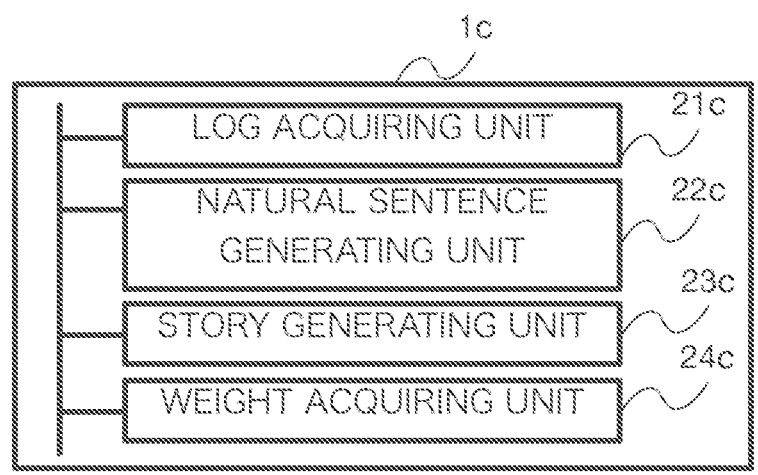
FIG. 5 is a diagram showing an outline of a functional configuration of an information processing apparatus that corresponds to at least one embodiment of the present disclosure.

FIG. 5 is a diagram showing an outline of a functional configuration of an information processing apparatus 1c according to the present embodiment. The information processing apparatus 1c according to the present embodiment includes, in addition to a log acquiring unit 21c, a natural sentence generating unit 22c, and a story generating unit 23c having been described in the first embodiment with reference to FIG. 1, a weight acquiring unit 24c. Furthermore, the present embodiment differs from contents of processing described in the first embodiment in contents of processing by the natural sentence generating unit 22c.

The weight acquiring unit 24c acquires, for each log having been acquired by the log acquiring unit 21c, a weight of the log. In this case, the weight acquiring unit 24c may acquire information regarding a weight of a log which has been added in advance and stored in the log storage apparatus or may newly add a weight by analyzing a log acquired from the log storage apparatus. In this case, a method of expressing a weight is not limited. For example, a weight can be expressed as a rank or a numerical value.

In addition, in the third embodiment, the natural sentence generating unit 22c adjusts a natural sentence to be generated in accordance with a weight of each log having been acquired by the log acquiring unit 21c.

Flow of Processing

Next, a flow of processing to be executed in the present embodiment will be described. It Is to be understood that specific contents and processing sequences of the processing shown in the flow chart according to the embodiment merely represent one example of implementing the present disclosure. Specific contents and processing sequences of the processing may be selected as deemed appropriate in accordance with the embodiments of the present disclosure.

Figure 6:
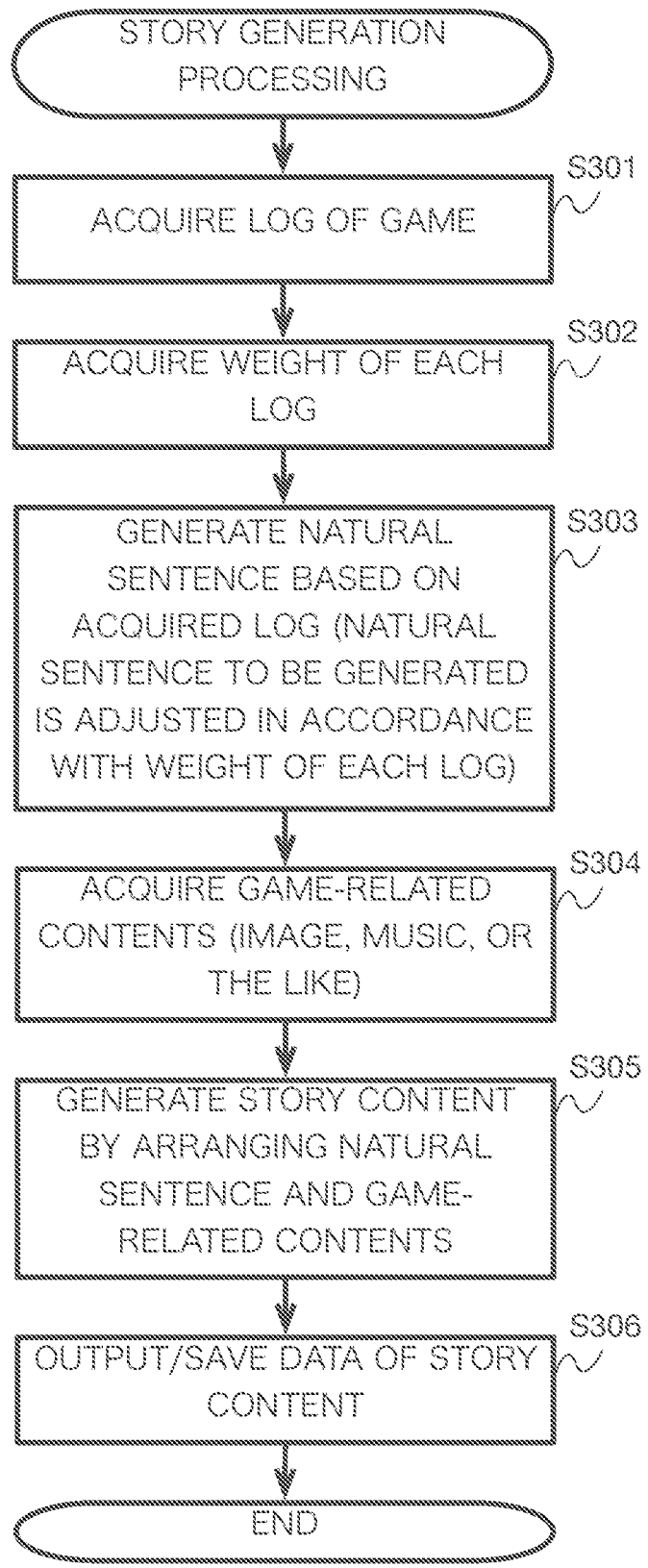
FIG. 6 is a flow chart showing a flow of story generation processing that corresponds to at least one embodiment of the present disclosure.

FIG. 6 is a flow chart showing a flow of story generation processing according to the third embodiment. Execution of the processing shown in the present flow chart is triggered by reception by the information processing apparatus 1c of an instruction to start story generation.

In step S301 and step S302, a log and a weight of the log are acquired. The log acquiring unit 21c acquires a log from the log storage apparatus (step S301). As described earlier, the log acquired at this time includes information that enables a timing at which the log had been generated in a game to be specified. Once a log is acquired by the log acquiring unit 21c, the weight acquiring unit 24c acquires, for each log having been acquired by the log acquiring unit 21c, a weight of the log (step S302). Subsequently, the processing advances to step S303.

In step S303, a natural sentence based on a log is generated. The natural sentence generating unit 22c generates a natural sentence based on the acquired log (step S303). In doing so, the natural sentence generating unit 22c adjusts a natural sentence to be generated in accordance with a weight of each log having been acquired by the log acquiring unit 21c. Subsequently, the processing advances to step S304.

In step S304, game-related contents are acquired. The story generating unit 23c acquires one or a plurality of game-related contents (step S304). The game-related contents that are acquired at this time are game-related contents that are related to logs stored in the log storage apparatus. In addition, the game-related contents that are acquired at this time are associated with an in-game timing related to the game-related contents as metadata. Subsequently, the processing advances to step S305.

In step S305 and step S306, story content is generated and output. The story generating unit 23c generates story content to be appreciated by the user by arranging the natural sentence having been generated by the natural sentence generating unit 22c and one or a plurality of game-related contents related to the log having been acquired by the log acquiring unit 21c (step S305). Generated story data is output to and saved by a storage apparatus of the information processing apparatus 1c or another storage apparatus (step S306). Subsequently, the processing shown in the present flow chart is ended.

As described above, as an aspect of the present disclosure, the information processing apparatus 1c includes the log acquiring unit 21c, the natural sentence generating unit 22c, the story generating unit 23c, and the weight acquiring unit 24c, and the natural sentence generating unit 22c adjusts a natural sentence to be generated in accordance with a weight of each log. Therefore, according to the aspect of the present disclosure, a natural sentence to be generated can be imparted with expressiveness in accordance with the weight of the log.

Fourth Embodiment

Next, a fourth embodiment will be described. With respect to components and processing contents in common with the first embodiment, the first embodiment will be referred to and descriptions thereof will be omitted.

Configuration of Apparatus

Figure 7:
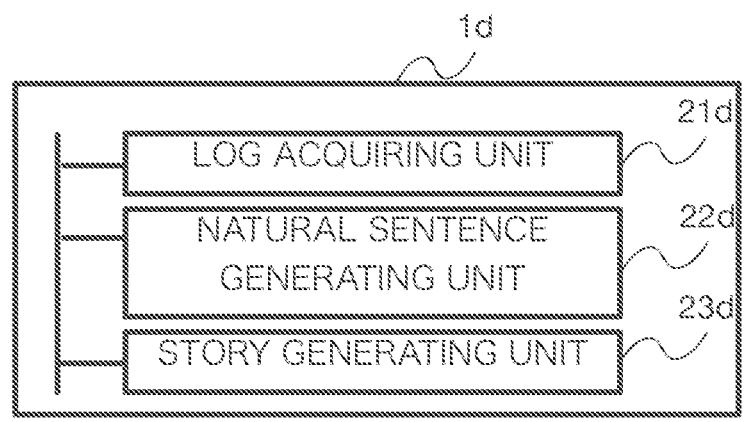
FIG. 7 is a diagram showing an outline of a functional configuration of an information processing apparatus that corresponds to at least one embodiment of the present disclosure.

FIG. 7 is a diagram showing an outline of a functional configuration of an information processing apparatus 1d according to the present embodiment. While the information processing apparatus 1d according to the present embodiment includes a log acquiring unit 21d, a natural sentence generating unit 22d, and a story generating unit 23d in a similar manner to the first embodiment, contents of processing by the natural sentence generating unit 22d differ from contents of processing described in the first embodiment.

In the fourth embodiment, the natural sentence generating unit 22d adjusts, for each log, at least any of a length and diction of each portion which corresponds to each log among the natural sentence to be generated. In this case, diction refers to, for example, a style of writing based on words and phrases, wording, rhetoric, and the like.

Flow of Processing

Next, a flow of processing to be executed in the present embodiment will be described. It is to be understood that specific contents and processing sequences of the processing shown in the flow chart according to the embodiment merely represent one example of implementing the present disclosure. Specific contents and processing sequences of the processing may be selected as deemed appropriate in accordance with the embodiments of the present disclosure.

Figure 8:
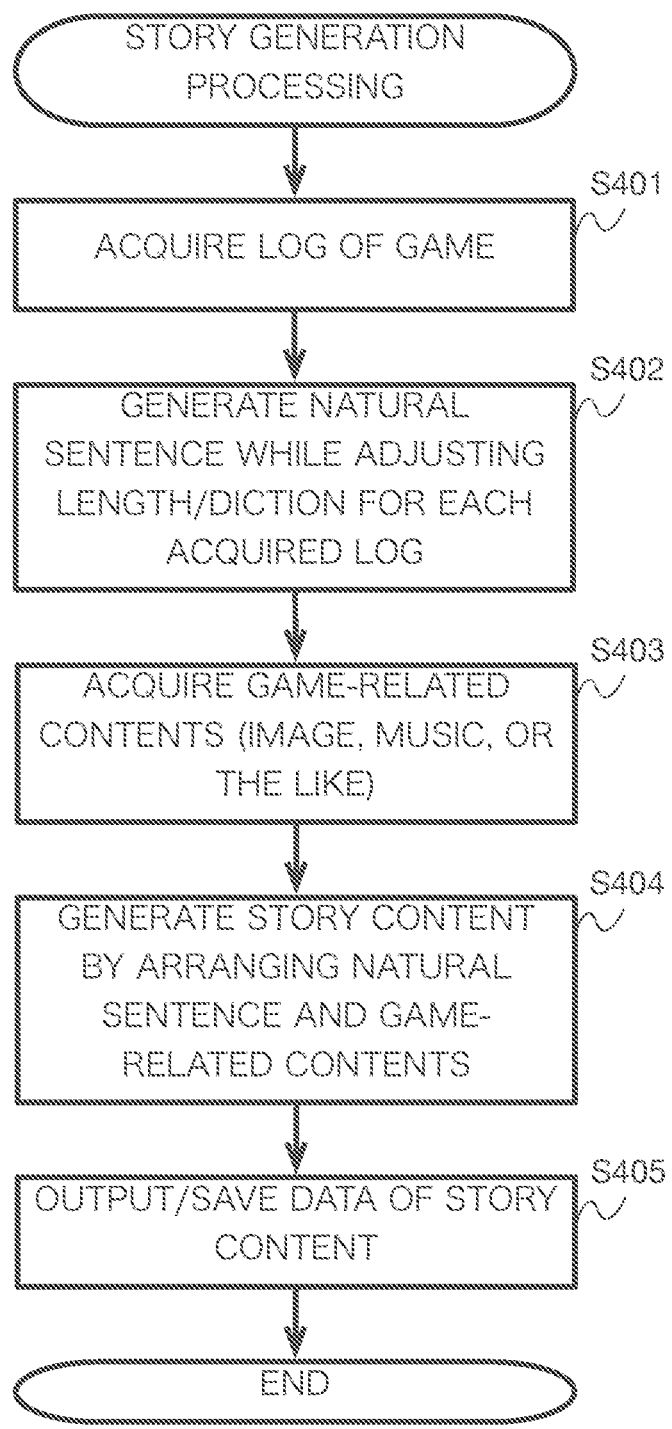
FIG. 8 is a flow chart showing a flow of story generation processing that corresponds to at least one embodiment of the present disclosure.

FIG. 8 is a flow chart showing a flow of story generation processing according to the fourth embodiment. Execution of the processing shown in the present flow chart is triggered by reception by the information processing apparatus 1d of an instruction to start story generation.

in step S401 and step S402, a natural sentence based on a log is generated. The log acquiring unit 21d acquires a log from the log storage apparatus (step S401). As described earlier, the log acquired at this time includes information that enables an in-game timing at which the log had been generated in a game to be specified.

Once a log is acquired by the log acquiring unit 21d, the natural sentence generating unit 22d generates a natural sentence based on the acquired log (step S402). In this case, the natural sentence generating unit 22d adjusts, for each log, at least any of a length and diction of each portion which corresponds to each log among the natural sentence to be generated. For example, the natural sentence generating unit 22d generates a natural sentence such that a natural sentence corresponding to a log having a heavier weight is longer and a natural sentence corresponding to a log having a fighter weight is shorter. Alternatively, the natural sentence generating unit 22d generates a natural sentence such that a natural sentence corresponding to a log having a heavier weight is given a larger amount of rhetoric and a natural sentence corresponding to a log having a lighter weight is given a smaller amount of rhetoric. However, a criterion of adjustment is not limited to a weight being imparted to each log. For example, adjustment may be performed randomly regardless of a weight of a log. Subsequently, the processing advances to step S403.

In step S403, game-related contents are acquired. The story generating unit 23d acquires one or a plurality of game-related contents (step S403). The game-related contents that are acquired at this time are game-related contents that are related to logs stored in the log storage apparatus. Subsequently, the processing advances to step S404.

In step S404 and step S405, story content is generated and output. The story generating unit 23d generates story content to be appreciated by the user by arranging the natural sentence having been generated by the natural sentence generating unit 22*d* and one or a plurality of game-related contents related to the log having been acquired by the log acquiring unit 21*d* (step S404). Generated story data is output to and saved by a storage apparatus of the information processing apparatus 1*d* or another storage apparatus (step S405). Subsequently, the processing shown in the present flow chart is ended.

As described above, as an aspect of the present disclosure, the information processing apparatus 1*d* includes the log acquiring unit 21*d*, the natural sentence generating unit 22*d*, and the story generating unit 23*d*, and the natural sentence generating unit 22*d* adjusts at least any of a length and diction of a natural sentence to be generated for each log. Therefore, according to the aspect of the present disclosure, a natural sentence to be generated can be imparted with expressiveness.

Fifth Embodiment

Configuration of Apparatus

Figure 9:
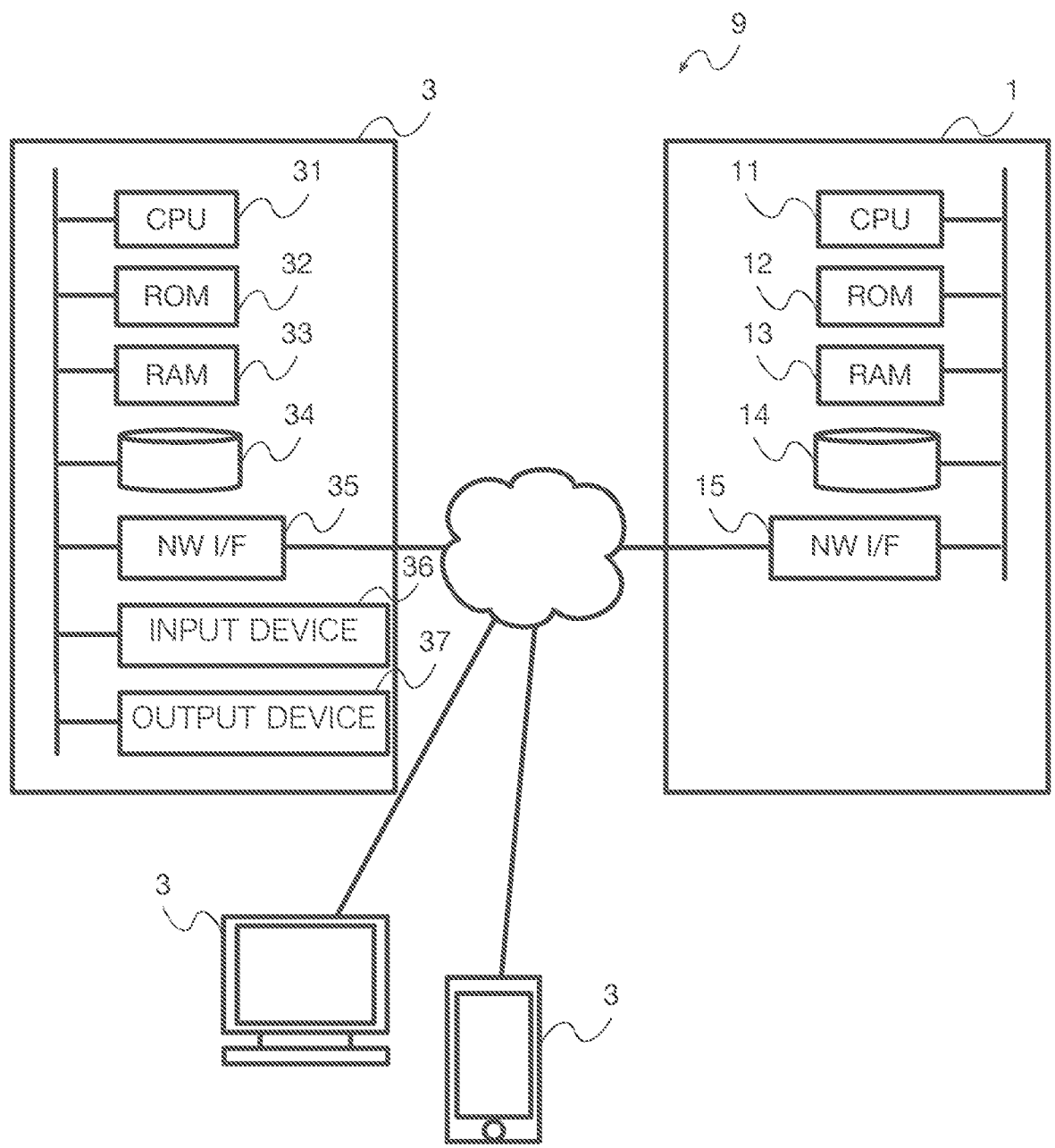
FIG. 9 is a diagram showing an outline of a configuration of an information processing system that corresponds to at least one embodiment of the present disclosure.

FIG. 9 is a diagram showing an outline of a configuration of an information processing system 9 according to the present embodiment. The information processing system 9 according to the present embodiment has an information processing apparatus 1 and a plurality of user terminals 3 which are connected to a network such as the Internet. The information processing apparatus 1 is a server 1 for a game which the plurality of user terminals 3 are to participate in. While examples of a game that is performed by having the plurality of user terminals 3 connect to the server 1 include a massively multiplayer online role-playing game (MMORPG), games to which the technique according to the present disclosure can be applied are not limited to the example according to the present embodiment. In addition, the user terminal 3 is a game device or the like to be used by the user. While various types of devices can be used as the game device of which examples include a personal computer, a smartphone a mobile game device, a stationary game device, and a wearable electronic device (for example, a virtual reality (VR) headset or a smart watch), types of devices are not limited. The user can play a game by having the user terminal 3 and the information processing apparatus 1 execute game processing based on a game processing program.

The information processing apparatus 1 is an information processing apparatus in which a central processing unit (CPU) 11, a read only memory (ROM) 12, a random access memory (RAM) 13, an auxiliary storage apparatus 14, and a network interface 15 for communicating with the outside via a network are connected to each other in a wired or wireless manner. It should be noted that, with respect to a specific hardware configuration of the information processing apparatus 1, components may be omitted, replaced, or added as deemed appropriate in accordance with embodiments.

The CPU 11 controls respective components included in the information processing apparatus 1 such as the RAM 13 and the auxiliary storage apparatus 14 by processing commands and data having been loaded on the ROM 12, the RAM 13, and the like. In addition, the RAM 13 is a main storage apparatus which is controlled by the CPU 11, and various commands and data are written into and read from the RAM 13. In other words, the CPU 11, the ROM 12, and the RAM 13 constitute a control unit of the information processing apparatus 1.

The auxiliary storage apparatus 14 is a nonvolatile storage apparatus, and mainly information that is desirably retained even after turning off the power of the information processing apparatus 1 such as an operating system (OS) to be loaded to the RAM 13, various programs for executing processing to be described later, and various types of data to be used by the information processing apparatus 1 are written into and read from the auxiliary storage apparatus 14. For example, an electrically erasable programmable ROM (EEPROM) or a hard disk drive (HDD) can be used as the auxiliary storage apparatus 14.

In addition, the auxiliary storage apparatus 14 of the information processing apparatus 1 further functions as a log storage apparatus by storing logs of game processing by the information processing apparatus 1 and the user terminal 3. However, the log storage apparatus may be mounted inside the user terminal 3 or mounted to another apparatus that is connected via communicating means such as a network.

The user terminal 3 is an information processing apparatus in which a CPU 31, a ROM 32, a RAM 33, an auxiliary storage apparatus 34, a network interface 35, an input device 36, and an output device 37 are connected to each other in a wired or wireless manner. It should be noted that, with respect to a specific hardware configuration of the user terminal 3, components may be omitted, replaced, or added as deemed appropriate in accordance with embodiments.

As the input device 36, various apparatuses including a button, a stick, a keyboard, a mouse, a trackball, a touch sensor, an acceleration sensor, an angular velocity sensor, a camera, a depth sensor, and a microphone can be adopted. As the output device 37, various apparatuses including a display, a speaker, an oscillator, and an LED can be adopted. In addition, the input device 36 and the output device 37 that displays related contents may be provided together by adopting a touch panel-added display.

Other than the exemplary auxiliary storage apparatus 14 of the information processing apparatus 1, a detachably mounted portable medium may be used as the auxiliary storage apparatus 34 of the user terminal 3. Examples of a portable medium include a card/cartridge-type medium such as a ROM, a compact disc (CD), a digital versatile disc (DVD), and a Blu-ray (®) Disc (BD). An auxiliary storage apparatus constituted by a portable medium and a non-portable auxiliary storage apparatus may be used in combination with each other.

Figure 10:
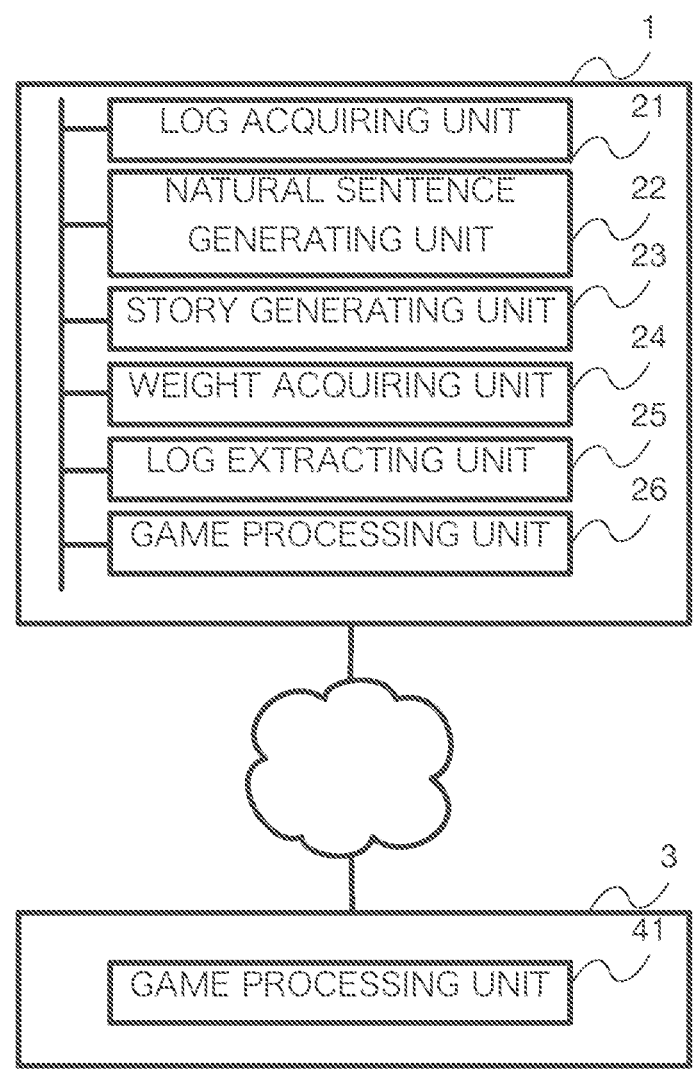
FIG. 10 is a diagram showing an outline of a functional configuration of an information processing apparatus that corresponds to at least one embodiment of the present disclosure.

FIG. 10 is a diagram showing an outline of a functional configuration of the information processing system 9 according to the present embodiment. The information processing apparatus 1 according to the present embodiment functions as a server 1 including a leg acquiring unit 21, a natural sentence generating unit 22, a story generating unit 23, a weight acquiring unit 24, a log extracting unit 25, and a game processing unit 26 as the CPU 11 interprets and executes various programs having been loaded on the ROM 12, the RAM 13, and the like. While an example in which all of these functions are to be executed by the general-purpose CPU 11 will be described in the present embodiment, alternatively, a part of or all of the functions may be realized by one or a plurality of processors. In addition, each functional unit included in the information processing apparatus 1 may be implemented remotely and/or implemented in a distributed manner (for example, on the cloud). Furthermore, the functional units may be realized by a plurality of software modules instead of a single software module.

In addition, the user terminal 3 according to the present embodiment functions as the user terminal 3 including a game processing unit 41 as the CPU 31 interprets and executes various programs having been loaded on the ROM 32, the RAM 33, and the like. While an example in which all of these functions are to be executed by the general-purpose CPU 31 will be described in the present embodiment, alternatively, a part of or all of the functions may be realized by one or a plurality of processors. In addition, each functional unit included in the user terminal 3 may be implemented remotely and/or implemented in a distributed manner (for example, on the cloud). Furthermore, the functional units may be realized by a plurality of software modules instead of a single software module.

The game processing unit 26 of the information processing apparatus 1 and the game processing unit 41 of the user terminal 3 cooperatively execute game processing (in the example according to the present embodiment, game processing of an MMORPG) while communicating with each other. An execution result of the game processing is stored as a log in the log storage apparatus. While the log storage apparatus is mounted inside the information processing apparatus 1 in the present embodiment as described above, locations where the log storage apparatus is to be mounted are not limited to the locations exemplified in the present disclosure.

The log acquiring unit 21 acquires a log of a game being played by a user (a player) from the log storage apparatus that stores the log. In this case, for example, play data or saved data of a computer game, a game record of Shogi or chess, a play record of a board game or a card game, or the like corresponds to a log of a game and types of games to be an object of a log are not limited. A log of a game includes information in which information that enables contents of actions or contents of operations of a player during a game, events that have occurred in the game, states of the game, and the like to be specified is recorded together with information that enables an "in-game timing" (which may be expressed by, for example, an in -game time, an actual time, or an in-game turn number) at which the log had been generated/recorded in the gams to be specified. In other words, a log of a game is a record which enables a certain amount or more of game play to be reproduced.

The weight acquiring unit 24 acquires, for each log having been acquired by the log acquiring unit 21, a weight of the log. In this case, the weight acquiring unit 24 may acquire information regarding a weight of a log which has been added in advance and stored in the log storage apparatus or may newly add a weight by analyzing a log acquired from the log storage apparatus. In this case, a method of expressing a weight is not limited. For example, a weight can be expressed as a rank or a numerical value. In addition, for example, weighting is performed by giving a rank set in advance or adding a numerical value set in advance by taking the following elements into consideration.

In the case of a game with a story, a log of an important point set in advance
  A log created when major damage is inflicted/sustained
  A log created when a special attack, a combo, a counter attack, a difficult operation, or the like is successfully executed
  A log created when an erroneous operation or determination is made
  A log of an in-game event/operation/action (including misses) that conceivably made a significant impact on the outcome of the game
  A log created when engaging in a conversation or cooperative play with another character (a non-player character or a player character)
  A log created when logging in after a long hiatus
  A log related to a dungeon or an enemy with which a player had a hard time (regardless of level of difficulty)
  A log created when obtaining a rare item or purchasing an expensive item
  A log created when using predetermined magic/skill/weapon/item or the like for the first time
  A log created when the game switches to a new music theme The log extracting unit 25 extracts a priority log that had a major influence on the progress of the game related to the log from the logs acquired by the log acquiring unit 21. In this case, for example, the log extracting unit 25 may refer to weights having been added by the weight acquiring unit 24 and extract logs having a weight that is equal to or heavier than a predetermined weight as priority logs or sort logs in a descending order of weights and extract a predetermined number of high -order logs as priority logs. Alternatively, for example, the log extracting unit 25 may extract logs satisfying a predetermined condition which can be assumed as having a major influence on the progress of the game as priority logs. In this case, examples of the predetermined condition include the elements exemplified in the description of the weight acquiring unit 24 presented above.

The natural sentence generating unit 22 generates a natural sentence based on the log having been acquired by the log acquiring unit 21. When generating a natural sentence, the log is referred to in an order of in-game timings, and a natural sentence along an order of game play is generated by having a natural sentence based on the log be generated along a time series In the game. While specific means of generating a natural sentence are not limited, for example, a method of generating a sentence involving extracting/predicting a word from a log and fitting the word into a template or a method involving extracting/predicting a word from a log and generating a sentence using a language model can be adopted. In doing so, a model having machine-learned a correspondence relationship between a sample word and a corresponding log can be used to predict a word. As another method, a model having machine-learned a correspondence relationship between a log or SVO having been extracted/predicted from a log and a sample sentence to which embroidery or rhetoric has been applied can also be used. Furthermore, with respect to types of games of which a main narrative is determined to a certain degree, a template text may be prepared for main portions of the narrative and a natural sentence may be generated by fitting a word extracted from the log into the template text. In addition, a natural sentence may be generated by combining a plurality of methods (which may include the methods exemplified above or may constitute of methods that have not been exemplified).

Using such methods enable generation of a natural sentence which is not a simple conversion of a log into a sentence or a digest or a summary of game play but a natural sentence which has been described as an experience from a point of view of a player character inside the game and which can be appreciated as a story. According to the method described above, for example, from a log that reads "10:10 on Feb. 29, 2020, defeated Slime at map coordinates ", a natural sentence describing that "I was assaulted by Slime. I drew my sword at precisely the last moment and managed to strike its stomach . . ." can be created and, for example, from a log that reads "10:15 on Feb. 29, 2020, approached enemy character up to map coordinates  and landed a punch", a natural sentence describing that "The enemy and I have history, this being our fifth face-to-face. I carefully measured the distance between us to make extra sure not to enter my enemy's attack radius. But, inevitably, one of us had to make a move . . ." can be created. These natural sentences are not simple conversions of a log into a sentence hut are natural sentences that can be appreciated as a story since embroidery and rhetoric that cannot be directly derived from a log on its own have been added using a template or a machine learning model.

In addition, the natural sentence generating unit 22 adjusts a natural sentence to be generated in accordance with a weight of each log having been acquired by the log acquiring unit 21. For example, the natural sentence generating unit 22 may be configured to generate a natural sentence using a log having a weight that is equal to or heavier than a predetermined weight. However, the method of using a weight is not limited to the selection of a log. The natural sentence generating unit 22 may generate a natural sentence using all logs.

Furthermore, the natural sentence generating unit 22 can adjust, for each log, at least any of a length and diction of each portion which corresponds to each log among the natural sentence to be generated. In this case, diction refers to, for example, a style of writing based on words and phrases, wording, rhetoric, and the like. In doing so, the natural sentence generating unit 22 may adjust, in accordance with a weight added to each log, at least any of a length and diction of each portion which corresponds to each log among the natural sentence to be generated. Accordingly, for example, a sentence related to a log with a heavy weight such as contents of a match-up with an important enemy character in a roll playing game can be made a long and detailed sentence while a sentence related to a log with a fight weight such as contents of a match-up with a not-so-important enemy character can be made a short and concise sentence. It should be noted that an adjustment of a length or diction of a sentence as described above can be accommodated by providing a template to be prepared in advance with a variation in accordance with a weight of a log or providing a machine learning model with a variation in accordance with a weight of a log. However, a specific technique to be used to adjust a natural sentence is not limited to the examples described in the present disclosure.

In addition, the game according to the present embodiment is a multi-player game to be played by a plurality of players and a log may include a message (text or audio) input by each of the plurality of players. Therefore, in the present embodiment, the natural sentence generating unit 22 can incorporate a text based on a message having been input by a player into a natural sentence as a conversation conducted by a character who appears in a story.

The story generating unit 23 generates story content to be appreciated by the user by arranging the natural sentence having been generated by the natural sentence generating unit 22 and one or a plurality of game-related contents (still images, moving images, music data, and the like) related to the log having been acquired by the log acquiring unit 21. In this case, the story generating unit 23 arranges each of one or a plurality of game-related contents in proximity to a natural sentence that corresponds to a log related to an in-game timing in proximity to an in -game timing related to the game-related content. Furthermore, in doing so, the story generating unit 23 may arrange, in proximity to a natural sentence corresponding to a priority log having been extracted by the log extracting unit 25, game-related content related to an in-game timing in the vicinity of an in-game timing related to the priority log.

Data (story data) of the generated story content includes text data of the natural sentence and a link to actual data of the game-related content (a still image, a moving image, music data, or the like) or to the game-related content. In addition, in the story data, the game-related content is arranged by specifying a position in the natural sentence. In this case, a method of specifying a position in the natural sentence is not limited. For example, a page number, a row number, or a character number can be specified. Accordingly, when the user appreciates the story content, a game image related to an in-game timing that corresponds to a given scene can be displayed during game play in proximity to a sentence describing the scene or an image or music having been reproduced at an in-game timing that corresponds to a given scene can be reproduced during game play at a timing where a sentence describing the scene is to be displayed (or reproduced in the case of automatic read -out).

Flow of Processing

Next, a flow of processing to be executed in the present embodiment will be described. It is to be understood that specific contents and processing sequences of the processing shown in the flow chart according to the embodiment merely represent one example of implementing the present disclosure. Specific contents and processing sequences of the processing may be selected as deemed appropriate in accordance with the embodiments of the present disclosure.

Figure 11:
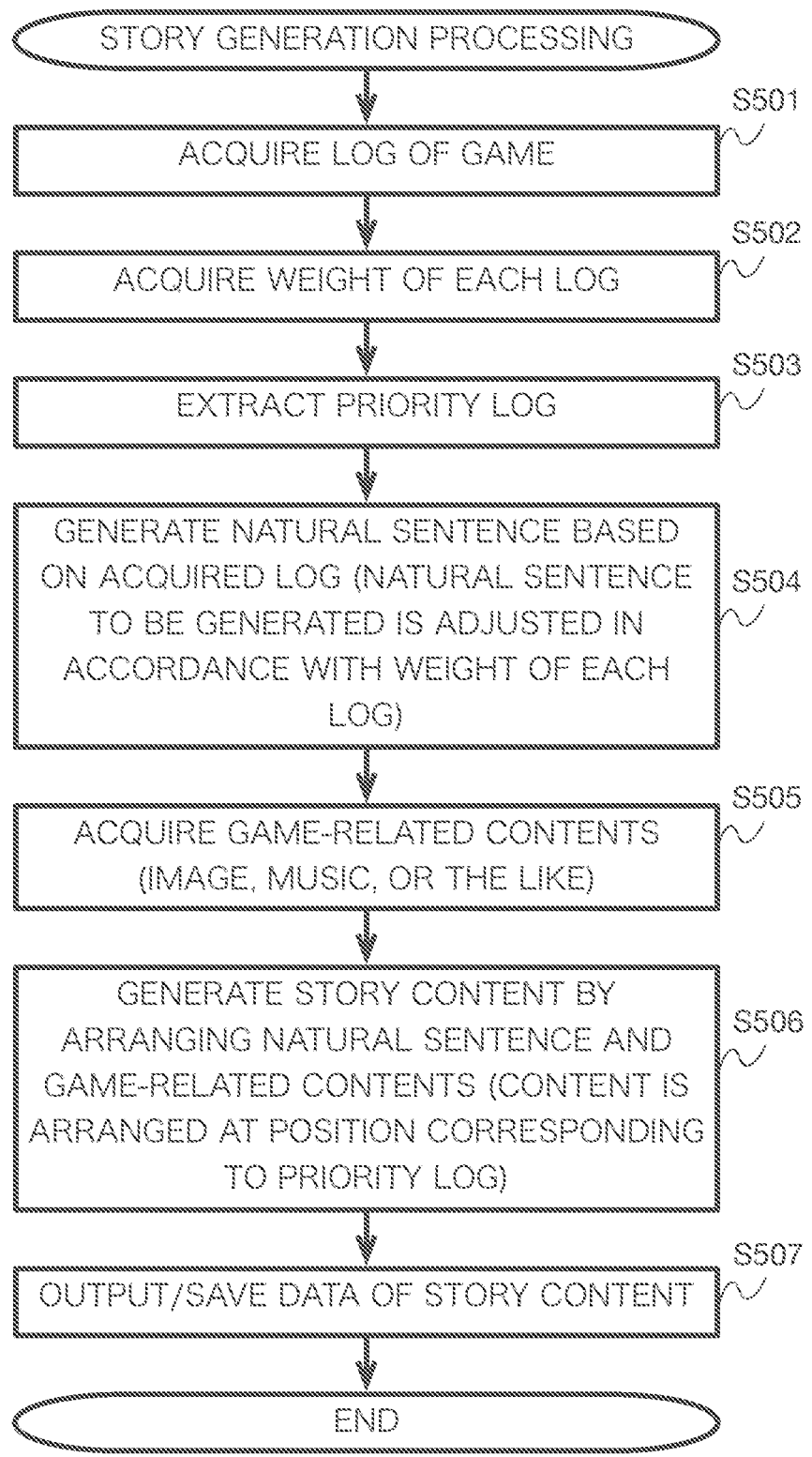
FIG. 11 is a flow chart showing a flow of story generation processing that corresponds to at least one embodiment of the present disclosure.

FIG. 11 is a flow chart showing a flow of story generation processing according to the fifth embodiment. Execution of the processing shown in the present flow chart is triggered by reception by the information processing apparatus 1 of an instruction to start story generation.

Acquisition and extraction of a log are performed in step S501 to step S503. The log acquiring unit 21 acquires a log from the log storage apparatus (step S501). In a similar manner to the first embodiment, the log acquired at this time includes information that enables a timing (an in-game timing) at which the log had been generated in the game to be specified. Once a log is acquired by the log acquiring unit 21, the weight acquiring unit 24 acquires, for each log having been acquired by the log acquiring unit 21, a weight of the log (step S502). In addition, the log extracting unit 25 extracts a priority log that had a major influence on the progress of the game related to the log from the acquired logs (step S503). Subsequently, the processing advances to step S504.

In step S504, a natural sentence based on a log is generated. The natural sentence generating unit 22 generates a natural sentence based on the acquired log (step S504). In doing so, the natural sentence generating unit 22 adjusts a natural sentence to be generated in accordance with a weight of each log having been acquired by the log acquiring unit 21. Subsequently, the processing advances to step S505.

In step S505, game-related contents are acquired. The story generating unit 23 acquires one or a plurality of game-related contents (step S505). The game -related contents that are acquired at this time are game-related contents that are related to logs stored in the log storage apparatus. The game-related contents can be acquired from the log storage apparatus, the user terminal 3, or another server. In addition, the game-related contents that are acquired at this time are associated with an in-game timing related to the game-related contents as metadata. Subsequently, the processing advances to step S506.

In step S506 and step S507, story content is generated and output. The story generating unit 23 generates story content to be appreciated by the user by arranging the natural sentence having been generated by the natural sentence generating unit 22 and one or a plurality of game-related contents related to the log having been acquired by the log acquiring unit 21 (step S506). Generated story data is output to and saved by a storage apparatus of the information processing apparatus 1 or another storage apparatus (step S507). Subsequently, the processing shown in the present flow chart is ended.

As described above, each of the embodiments according to the present application solves one or more deficiencies. It should be noted that effects produced by each embodiment are non-limiting effects or examples of effects.

Other Variations

The embodiments described above merely represent examples of implementing the present disclosure and are not intended to limit the present disclosure to the specific configurations described above. When implementing the present disclosure, a specific configuration may be adopted as deemed appropriate in accordance with each embodiment.

While the technique according to the present disclosure has been described using an example of a multi-player computer game in the fifth embodiment, a game to which the technique according to the present disclosure can be applied may be a single-player game or a game that does not use a computer. In addition, a genre of games to which the technique according to the present disclosure can be applied is also not limited. Besides a so-called roll playing game, the technique according to the present disclosure can be applied to games of all types including an action game, a simulation game, a shooting game, a puzzle game, a card game, a board game, chess, and Shogi. For example, when a game record of Shogi is to be used as a log for story generation, with the technique according to the present disclosure, from a log that reads "**th move: Sx43", a natural sentence described as an experience from a view point of a player character in the game can be generated such as "Foot soldiers and spearmen were visible up ahead. I hesitated, just for split second, but then reminded myself that it was my duty as ordered by the king to serve as a shield for our generals. I advanced, one step at a time and, before I knew it, I was close enough to the enemy to touch their spears".

In addition, while an example of performing generation processing of a story with a server has been described in the fifth embodiment, the generation processing of a story may be performed with an apparatus other than a server such as a local user terminal.

Appendants

The description of the embodiments described above has been described so that those having ordinary knowledge in the field to which the disclosure belongs can carry out the followings.

Appendant 1

A non-transitory computer-readable recording medium having recorded thereon a program that causes a computer to be connected to a log storage apparatus which stores a log of a game to execute:

acquiring the log;

generating a natural sentence based on the acquired log; and generating story content to be appreciated by a user by arranging the generated natural sentence and one or a plurality of game-related contents that are related to the log.

Appendant 2

The non-transitory computer-readable recording medium having recorded thereon the program according to Appendant 1, wherein generating the story content includes arranging each of one or a plurality of game-related contents in proximity to the natural sentence that corresponds to the log related to an in-game timing in proximity to an in-game timing related to the game-related content.

Appendant 3

The non-transitory computer-readable recording medium having recorded thereon the program according to Appendant 2, the program further causes the computer to execute extracting a priority log having had a major influence on progress of the game from the log, wherein generating the story content includes arranging the game-related content that is related to an in-game timing in proximity to an in-game timing related to the priority log in proximity to the natural sentence that corresponds to the priority log.

Appendant 4

The non-transitory computer-readable recording medium having recorded thereon the program according to any one of Appendants 1 to 3, further causes the computer to execute acquiring a weight of each log, wherein generating the natural sentence includes adjusting a natural sentence to be generated in accordance with the acquired weight of each log, Appendant 5

The non-transitory computer-readable recording medium having recorded thereon the program according to Appendant 4, wherein generating the natural sentence includes generating the natural sentence using a log having a weight that is equal to or heavier than a predetermined weight among the log.

Appendant 6

The non-transitory computer-readable recording medium having recorded thereon the program according to any one of Appendants 1 to 5, wherein generating the natural sentence includes adjusting, for each log, at least any of a length and diction of each portion which corresponds to each log among the natural sentence to be generated.

Appendant 7

The non-transitory computer-readable recording medium having recoated thereon the program according to Appendant 6, wherein generating the natural sentence includes adjusting, in accordance with a weight added to each log, at least any of a length and diction of each portion which corresponds to each log among the natural sentence to be generated.

Appendant 8

The non-transitory computer-readable recording medium having recorded thereon the program according to any one of Appendants 1 to 7, wherein the game-related content includes a game image, and generating the story content includes generating illustrated story content by arranging the generated natural sentence and one or a plurality of game images that are related to the log.

Appendant 9

The non-transitory computer-readable recording medium having recorded thereon the program according to any one of Appendants 1 to 8, wherein the game-related content includes game music, and generating the story content includes generating story content accompanied by background music by arranging the generated natural sentence and one or a plurality of pieces of game music that are related to the log.

Appendant 10

The non-transitory computer-readable recording medium having recorded thereon the program according to any one of Appendants 1 to 9, wherein the game is a multi-player game to be played by a plurality of players, the log includes a message input by each of the plurality of players, and generating the natural sentence includes incorporating a text based on the message into the natural sentence to be generated as a conversation carried out by a character who appears in the story.

Appendant 11

An information processing apparatus connected to a log storage apparatus which stores a log of a game, the information processing apparatus comprising:

a memory; and a processor coupled to the memory, the processor being configured to execute:

acquiring the log;

generating a natural sentence based on the acquired log; and generating story content to be appreciated by a user by arranging the generated natural sentence and one or a plurality of game-related contents that are related to the log.

Appendant 12

A method by which at least one processor connected to a log storage apparatus which stores a log of a game executes:

acquiring the log;

generating a natural sentence based on the acquired log; and generating story content to be appreciated by a user by arranging the generated natural sentence and one or a plurality of game-related contents that are related to the log.

What is claimed is:

1. A non-transitory computer-readable recording medium having recorded thereon a program that causes a computer to be connected to a log storage apparatus which is configured to store a log of a game to execute:

acquiring the log;

generating a natural sentence based on the acquired log;

generating story content to be appreciated by a user by arranging the generated natural sentence and one or more game-related contents that are related to the log; and acquiring a weight of each log by giving a rank set in advance or adding a numerical value set associated with each log, wherein generating the natural sentence includes:

adjusting a natural sentence to be generated in accordance with the acquired weight of each log; and selecting a portion of the log having a weight that is equal to or heavier than a predetermined weight among the log, and generating the natural sentence including the selected portion of the log, and generating the natural sentence further includes:

for the natural sentence corresponding to the log with a heavier weight, making the natural sentence longer and/or giving the natural sentence a larger amount of rhetoric; and for the natural sentence corresponding to the log with a lighter weight, making the natural sentence shorter and/or giving the natural sentence a smaller amount of rhetoric.

2. The non-transitory computer-readable recording medium having recorded thereon the program according to claim 1, wherein generating the story content includes arranging each of one or more game-related contents in proximity to the natural sentence that corresponds to the log related to an in-game timing in proximity to an in-game timing related to the game-related content.

3. The non-transitory computer-readable recording medium having recorded thereon the program according to claim 2, the program further causes the computer to execute extracting a priority log having had a major influence on progress of the game from the log, wherein the priority log satisfies a predetermined condition associated with a major influence on the progress of the game, and wherein generating the story content includes arranging the game-related content that is related to an in-game timing in proximity to an in-game timing related to the priority log in proximity to the natural sentence that corresponds to the priority log.

4. The non-transitory computer-readable recording medium having recorded thereon the program according to claim 1, wherein generating the natural sentence includes adjusting, for each log, at least any of a length or diction of each portion which corresponds to each log among the natural sentence to be generated.

5. The non-transitory computer-readable recording medium having recorded thereon the program according to claim 1, wherein the game-related content includes a game image, and generating the story content includes generating illustrated story content by arranging the generated natural sentence and one or more game images that are related to the log.

6. The non-transitory computer-readable recording medium having recorded thereon the program according to claim 1, wherein the game-related content includes game music, and generating the story content includes generating story content accompanied by background music by arranging the generated natural sentence and one or more pieces of game music that are related to the log.

7. The non-transitory computer-readable recording medium having recorded thereon the program according to claim 1, wherein the game is a multi-player game to be played by a plurality of players, the log includes a message input by each player of the plurality of players, and generating the natural sentence includes incorporating a text based on the message into the natural sentence to be generated as the natural sentence included in a conversation carried out by at least one character who appears in the story.

8. An information processing apparatus connected to a log storage apparatus which is configured to store a log of a game, the information processing apparatus comprising:

a memory; and a processor coupled to the memory, the processor being configured to execute:

acquiring the log;

generating a natural sentence based on the acquired log;

generating story content to be appreciated by a user by arranging the generated natural sentence and one or more game-related contents that are related to the log; and acquiring a weight of each log by giving a rank set in advance or adding a numerical value set associated with each log, wherein generating the natural sentence includes:
   adjusting a natural sentence to be generated in accordance with the acquired weight of each log; and
   selecting a portion of the log having a weight that is equal to or heavier than a predetermined weight among the log, and generating the natural sentence including the selected portion of the log, and generating the natural sentence further includes:
   for the natural sentence corresponding to the log with a heavier weight, making the natural sentence longer and/or giving the natural sentence a larger amount of rhetoric; and
   for the natural sentence corresponding to the log with a lighter weight, making the natural sentence shorter and/or giving the natural sentence a smaller amount of rhetoric.

9. A method by which at least one processor connected to a log storage apparatus which is configured to store a log of a game executes:
   acquiring the log;
   generating a natural sentence based on the acquired log;
   generating story content to be appreciated by a user by arranging the generated natural sentence and one or more game-related contents that are related to the log; and
   acquiring a weight of each log by giving a rank set in advance or adding a numerical value set associated with each log, wherein generating the natural sentence includes:
   adjusting a natural sentence to be generated in accordance with the acquired weight of each log; and
   selecting a portion of the log having a weight that is equal to or heavier than a predetermined weight among the log, and generating the natural sentence including the selected portion of the log, and generating the natural sentence further includes:
   for the natural sentence corresponding to the log with a heavier weight, making the natural sentence longer and/or giving the natural sentence a larger amount of rhetoric; and
   for the natural sentence corresponding to the log with a lighter weight, making the natural sentence shorter and/or giving the natural sentence a smaller amount of rhetoric.

\* \* \* \* \*